(12) United States Patent
Yoshikawa et al.

(10) Patent No.: US 7,265,886 B2
(45) Date of Patent: Sep. 4, 2007

(54) OPTICAL SCANNER AND IMAGE FORMING APPARATUS

(75) Inventors: Motonobu Yoshikawa, Osaka (JP); Yoshiharu Yamamoto, Osaka (JP); Daizaburo Matsuki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 272 days.

(21) Appl. No.: 11/006,640

(22) Filed: Dec. 8, 2004

(65) Prior Publication Data

US 2005/0128549 A1   Jun. 16, 2005

(30) Foreign Application Priority Data

Dec. 11, 2003   (JP)   .............................. 2003-413336

(51) Int. Cl.
  *G02B 26/08*   (2006.01)
  *B41J 27/00*   (2006.01)
(52) U.S. Cl. ...................... 359/208; 359/207; 359/216; 359/204; 347/259; 347/261
(58) Field of Classification Search .................... None
  See application file for complete search history.

(56) References Cited

U.S. PATENT DOCUMENTS 6,185,029 B1 * 2/2001 Ishihara ...................... 359/216

FOREIGN PATENT DOCUMENTS

JP   9-304720   11/1997
JP   2000-19443   1/2000

* cited by examiner

*Primary Examiner*—James Phan
(74) *Attorney, Agent, or Firm*—McDermott Will & Emery LLP (57) ABSTRACT

The over-field type optical scanner includes a first imaging optical system disposed between a light source and a rotating polygon mirror for forming, on one surface of the rotating polygon mirror, a linear image with a width larger than a width along a main scanning direction of the one surface of the rotating polygon mirror; and a second imaging optical system composed of a curved mirror for focusing, on a scan surface, a light beam having been reflected by the rotating polygon mirror. The first imaging optical system includes a first conversion optical system for converting the light beam emitted from the light source into a divergent light beam with respect to the main scanning direction and into a convergent light beam with respect to the sub scanning direction; and a second conversion optical system having a refracting power in the main scanning direction.

55 Claims, 7 Drawing Sheets

OPTICAL SCANNER AND IMAGE FORMING APPARATUS

CROSS-REFERENCE TO RELATED APPLICATION

This application claims priority under 35 U.S.C. § 119 on Japanese Patent Application No. 2003-413336 filed on Dec. 11, 2003, the entire contents of which are hereby reference.

TECHNICAL FIELD

The present invention relates to an optical scanner used for, for example, writing images in an image forming apparatus, such as a laser beam printer, a laser facsimile or a digital copying machine, and an image forming apparatus equipped with the optical scanner.

BACKGROUND

Each of most optical scanners used in laser beam printers and the like includes a semiconductor laser working as a light source, a rotating polygon mirror, a first imaging optical system for making a light beam emitted from the light source linearly focused on the polygon mirror for correcting a face tangle error of the polygon mirror, and a second imaging optical system for introducing the light beam from the polygon mirror onto a scan surface and focusing the light beam in a uniform spot on the scan surface at an even speed.

Most of the conventional optical scanners are of an under-field type in which the effective opening along a main scanning direction is disposed before the polygon mirror so as to form, on a deflecting/reflecting surface of the polygon mirror, a linear image with a width smaller than the width along the main scanning direction of the reflecting surface. In an optical scanner of the under-field type, however, it is necessary to increase the inner diameter of the polygon mirror when the number of surfaces of the polygon mirror is desired to be increased for increasing the scanning speed. When the inner diameter of the polygon mirror is increased, however, the size of the whole polygon mirror is increased and a large force is necessary for rotationally driving the polygon mirror. Therefore, there is a given limit in increasing the inner diameter of the polygon mirror. Accordingly, the optical scanner of the under-field type has a problem that it is difficult to increase the scanning speed. As a countermeasure, an optical scanner of an over-field type in which a linear image with a width larger than the width of a reflecting surface of a polygon mirror is formed and the reflecting surface of the polygon mirror is regarded as the effective opening along the main scanning direction has recently been proposed (for example, as described in Japanese Laid-Open Patent Publication Nos. 9-304720 and 2000-19443).

An optical scanner disclosed in Japanese Laid-Open Patent Publication No. 9-304720, however, uses an expensive glass fθ lens as a second imaging optical system, and therefore, it has a problem that it is difficult to lower the cost. Furthermore, since an optical scanner disclosed in Japanese Laid-Open Patent Publication NO. 2000-19443 uses a plastic lens, it has a problem that its performance is largely degraded through temperature change.

SUMMARY

In consideration of the aforementioned conventional problems, disclosed concepts include an optical scanner of the over-field type for improving optical utilization efficiency and a center-corner-ratio while lowering the cost of the optical scanner and preventing performance degradation through temperature change.

The optical scanner includes a light source unit for emitting a light beam; a rotating polygon mirror having a plurality of deflecting/reflecting surfaces and scanning the light beam emitted from the light source unit along a main scanning direction; a first imaging optical system disposed between the light source unit and the rotating polygon mirror for forming, on one deflecting/reflecting surface of the rotating polygon mirror, a linear image with a width larger than a width along the main scanning direction of the one deflecting/reflecting surface of the rotating polygon mirror; and a second imaging optical system composed of one curved mirror for focusing, on a scan surface, the light beam having been reflected by the rotating polygon mirror, and the first imaging optical system and the second imaging optical system are disposed in different positions along a sub scanning direction perpendicular to the main scanning direction in such a manner that the light beam exited from the first imaging optical system obliquely enters a plane that includes a normal line of the deflecting/reflecting surface of the rotating polygon mirror and is parallel to the main scanning direction and the light beam exited from the rotating polygon mirror obliquely enters a YZ plane that includes a normal line on a vertex of the curved mirror and is parallel to the main scanning direction, and the first imaging optical system includes a first conversion optical system for converting the light beam emitted from the light source unit into a divergent light beam with respect to the main scanning direction and into a convergent light beam with respect to the sub scanning direction; and a second conversion optical system having a refracting power in the main scanning direction.

Owing to the aforementioned architecture, there is no need to use a glass fθ lens as the second imaging optical system in the optical scanner, and hence, the cost of the optical scanner can be lowered. Furthermore, since one curved mirror whose performance is minimally degraded through temperature change is used, the degradation of the performance through the temperature change can be prevented. Also, high performance of both optical utilization efficiency and a center-corner-ratio can be attained.

In the optical scanner, an image magnification ratio $\beta s2$ in the sub scanning direction of the second imaging optical system satisfies the following condition formula (1):

$$0.7 < \beta s2 < 2.6. \qquad \text{Formula (1):}$$

In the optical scanner, a light beam enters the deflecting/reflecting surface of the polygon mirror obliquely (at an incident angle $\theta P$) with respect to the sub scanning direction. Therefore, in the case where the distances between the respective deflecting/reflecting surfaces of the polygon mirror and the rotation center axis are varied (which corresponds to what is called optical face deflection $\Delta rp$), scanning positions along the sub scanning direction are varied (which corresponds to what is called jitter $\Delta Xi1$). The jitter $\Delta Xi1$ derived from the optical face deflection is represented by the following formula (28):

$$\Delta Xi1 = 2 \cdot \Delta rp \cdot \sin \theta P \cdot \beta s2 \qquad \text{Formula (28):}$$

Also, in the case where the conjugate relationship between the deflecting/reflecting surface and the scan sur face 9 is shifted (by $\Delta Zd$), variation (corresponding to jitter $\Delta Xi2$) of the scanning position along the sub scanning direction is caused on the scan surface depending upon the inclination (corresponding to what is called a face dangle angle $\Phi p$) of each surface of the polygon mirror 7 along the sub scanning direction. The jitter $\Delta Xi2$ derived from the face dangle is represented by the following formula (29):

$$\Delta Xi2 = \Delta Zd \cdot \tan(2 \cdot \Phi p/\beta s2) \qquad \text{Formula (29):}$$

When the magnification ratio exceeds the upper limit defined by the condition formula (1), the jitter $\Delta Xi1$ derived from the face deflection becomes large, and when the magnification ratio is smaller than the lower limit, the jitter $\Delta Xi2$ derived from the face dangle becomes large. Conversely speaking, the jitters $\Delta Xi1$ and $\Delta Xi2$ can be suppressed by satisfying the condition formula (1).

Furthermore, the jitters can be suppressed to be further smaller by satisfying the following condition formula (2):

$$0.95 < \beta s2 < 2.0. \qquad \text{Formula (2):}$$

In the optical scanner, the curved mirror may have a cross-section along the sub scanning direction in the shape of an arc or may be in a shape easily processed or measured. Alternatively, the curved mirror may be in a shape for correcting curvature of a scanning line derived from oblique incident. Alternatively, the curved mirror may be asymmetrical about the YZ plane. Furthermore, a reflecting surface of the curved mirror may be in such a torsional shape that normal lines of points thereon other than the vertex disposed on a curve (namely, a bus line) on which the YZ plane and the reflecting surface cross each other are not included in the YZ plane. Furthermore, angles of normal lines of points on the bus line against the YZ plane may be larger as the points are closer to a periphery of the reflecting surface. Alternatively, assuming that an angle of the light beam reflected by the curved mirror against an incident light beam exited from the deflecting/reflecting surface is in a positive direction, angles of normal lines of points on the bus line against the YZ plane may be in the positive direction.

Thus, the architectures of the optical systems can be simplified, and the curvature of a scanning line can be corrected while correcting the aberration of the light beam derived from the oblique incidence.

Also, the curved mirror may be an anamorphic mirror in which a curvature radius on the vertex in the main scanning direction is different from a curvature radius in the sub scanning direction. The reflecting surface of the curved mirror may be in a concave shape in both the main scanning direction and the sub scanning direction. The curved mirror may have a refracting power in the sub scanning direction on a reflecting surface thereof different between a center portion thereof and a peripheral portion thereof along the main scanning direction. Also, the curved mirror may have a curvature radius of a cross-section thereof in the sub scanning direction that does not depend upon a cross-sectional shape thereof in the main scanning direction.

Thus, image surface positions in the main scanning direction and the sub scanning direction and the curvatures of fields can be made preferable or optimum.

Furthermore, in the optical scanner, when a distance between a light exiting surface of the second conversion optical system and the deflecting/reflecting surface is assumed to be D3, an angle between the normal line of the deflecting/reflecting surface and an optical axis of the light beam exited from the first imaging optical system is assumed to be $\theta P$, an image magnification ratio in the sub scanning direction of the first imaging optical system is assumed to be $\beta s1$ and an effective F number in the sub scanning direction on the side of the light source unit is assumed to be Fs, the following condition formula (3) is satisfied: The following condition formula indicates a distance between the light beams obtained before entering the rotating polygon mirror and the reflected light beam. When the value of the formula is too large, the whole optical system becomes large and hence jitter derived from vibration becomes a problem. When the value of the formula is too small, it is difficult to dispose the second conversion optical system.

$$1 < D3 \cdot \tan[2\theta P - \sin^{-1}\{1/(Fs \cdot \beta s1)\}] < 10. \qquad \text{Formula (3):}$$

Furthermore, the following condition formula (4) indicates a more appropriate arrangement condition:

$$2 < D3 \cdot \tan[2 \cdot \theta P - \sin^{-1}\{1/(Fs \cdot \beta s1)\}] < 6. \qquad \text{Formula (4):}$$

Alternatively, another optical scanner includes a light source unit for emitting a light beam; a rotating polygon mirror having a plurality of deflecting/reflecting surfaces for scanning the light beam emitted from the light source unit along a main scanning direction; a first imaging optical system disposed between the light source unit and the rotating polygon mirror for forming, on one deflecting/reflecting surface of the rotating polygon mirror, a linear image with a width larger than a width along the main scanning direction of the one deflecting/reflecting surface of the rotating polygon mirror; and a second imaging optical system for focusing, on a scan surface, the light beam having been reflected by the rotating polygon mirror, and the first imaging optical system includes a first conversion optical system for converting the light beam emitted from the light source unit into a divergent light beam with respect to the main scanning direction and into a convergent light beam with respect to a sub scanning direction; and a second conversion optical system having a positive refracting power in the main scanning direction, and an image magnification ratio $\beta s2$ in the sub scanning direction of the second imaging optical system satisfies the following condition formula (5):

$$0.7 < \beta s2 < 2.6. \qquad \text{Formula (5):}$$

Owing to this architecture, in the optical scanner of the over-field type in which the occurrence of jitter is suppressed, high performance of both the optical utilization efficiency and the center-corner-ratio can be attained.

Furthermore, when the following condition formula (6) is satisfied, the occurrence of jitter can be further suppressed:

$$0.95 < \beta s2 < 2.0. \qquad \text{Formula (6):}$$

Moreover, when the light beam having passed through the first imaging optical system and entering the deflecting/reflecting surface is a convergent light beam converged with respect to the main scanning direction, high performances of the curvatures of fields in the main scanning direction and the sub scanning direction and the f$\theta$ characteristic can be attained while reducing a distance between the rotating polygon mirror and a focusing position.

Also, the first conversion optical system may include a collimator lens, a first lens having a negative refracting power in the main scanning direction and a second lens having a positive refracting power in the sub scanning direction arranged in this order from the side of the light source unit. The second conversion optical system may be composed of a third lens having a positive refracting power in the main scanning direction.

Furthermore, when the light source unit includes a plurality of light emitting points, a high scanning speed can be attained.

Moreover, when an angle of a straight line linking the plurality of light emitting points of the light source unit against a plane parallel to the main scanning direction is assumed to be y, a distance between adjacent light emitting points is assumed to be Po, an image magnification ratio in the sub scanning direction of all systems disposed between the light source unit and the scan surface is assumed to be βs, and a spot distance in the sub scanning direction on the scan surface is assumed to be Pis, the following condition formula (7) is preferably satisfied: In this case, the spot distance Pis can be set to a desired value by adjusting the angle γ.

$$\beta s \cdot Po \cdot \sin(\gamma) = Pis. \quad \text{Formula (7):}$$

Also, in the case where the light source unit has a plurality of light emitting points, if the optical axes of light beams emitted from the plural right emitting points are varied in their inclination, the center-corner-ratio may be largely degraded. Therefore, when an image magnification ratio in the main scanning direction of all systems disposed between the light source unit and the scan surface is assumed to be βm, the following condition formula (8) is preferably satisfied: When the magnification ratio βm is too small, the optical utilization efficiency is degraded, and hence necessary light intensity cannot be obtained on the scan surface. On the other hand, when the magnification ratio βm is too large, the degradation of the center-corner-ratio derived from the variation in the inclination of the optical axes becomes large.

$$1.0 < \beta m < 5. \quad \text{Formula (8):}$$

Furthermore, when the following condition formula (9) is satisfied, more appropriate optical utilization efficiency and center-corner-ratio can be realized:

$$1.5 < \beta m < 3.4. \quad \text{Formula (9):}$$

Moreover, when the following condition formula (10) is satisfied, more appropriate optical utilization efficiency and center-corner-ratio can be realized:

$$2.2 < \beta m < 2.8. \quad \text{Formula (10):}$$

Also, when an image magnification ratio in the sub scanning direction of all systems disposed between the light source unit and the scan surface is assumed to be βs, the following condition formula (11) is preferably satisfied: When the magnification ratio βs is too small, the optical utilization efficiency is degraded and hence necessary light intensity cannot be obtained on the scan surface. On the other hand, when the magnification ratio βs is too large, influence such as image surface movement caused by errors in arrangement of the light source and the collimator lens and the change of the wavelength becomes large.

$$10 < \beta s < 36. \quad \text{Formula (11):}$$

Furthermore, when the following condition formula (12) is satisfied, more appropriate optical utilization efficiency and arrangement tolerance can be realized:

$$19 < \beta s < 33. \quad \text{Formula (12):}$$

Moreover, when the following condition formula (13) is satisfied, more appropriate optical utilization efficiency and arrangement tolerance can be realized:

$$27 < \beta s < 30. \quad \text{Formula (13):}$$

Also, when an effective F number in the main scanning direction on the side of the light source unit is assumed to be Fm, the following condition formula (14) is preferably satisfied: When the F number Fm is too large, the optical utilization efficiency is degraded and hence necessary light intensity cannot be obtained on the scan surface. On the other hand, when the F number Fm is too small, the center-corner-ratio is largely reduced due to the variation in the inclination of the optical axes.

$$10 < Fm < 50. \quad \text{Formula (14):}$$

Furthermore, when the following condition formula (15) is satisfied, more appropriate optical utilization efficiency and center-corner-ratio can be realized:

$$15 < Fm < 34. \quad \text{Formula (15):}$$

Moreover, when the following condition formula (16) is satisfied, more appropriate optical utilization efficiency and center-corner-ratio can be realized:

$$18 < Fm < 23. \quad \text{Formula (16):}$$

Also, when an effective F number in the sub scanning direction on the side of the light source unit is assumed to be Fs, the following condition formula (17) is preferably satisfied: When the F number Fs is too large, the optical utilization efficiency is degraded and hence necessary light intensity cannot be obtained on the scan surface. On the other hand, when the F number Fs is too small, the influence such as the image surface movement caused by errors in the arrangements of the light source and the collimator lens and the change of the wavelength becomes large.

$$1.3 < Fs < 5. \quad \text{Formula (17):}$$

Furthermore, when the following condition formula (18) is satisfied, more appropriate optical utilization efficiency and arrangement tolerance can be realized:

$$1.5 < Fs < 2.5. \quad \text{Formula (18):}$$

Moreover, when the following condition formula (19) is satisfied, more appropriate optical utilization efficiency and arrangement tolerance can be realized:

$$1.7 < Fs < 1.9. \quad \text{Formula (19):}$$

Also, when an image magnification ratio in the main scanning direction of all systems disposed between the light source unit and the scan surface is assumed to be βm and an image magnification ratio in the sub scanning direction thereof is assumed to be βs, the following condition formula (20) is preferably satisfied: When a value βm−βs is too small, the optical utilization efficiency is degraded and hence necessary light intensity cannot be obtained on the scan surface. On the other hand when the value βm−βs is too large, the center-corner-ratio is largely reduced due to the variation in the inclination of the optical axes or the influence such as the image surface movement caused by an error in the arrangement of the collimator lens or the change of the wavelength becomes large.

$$30 < \beta m \cdot \beta s < 90. \quad \text{Formula (20):}$$

Furthermore, when the following condition formula (21) is satisfied, more appropriate optical utilization efficiency, center-corner-ratio and arrangement tolerance can be realized:

$$40 < \beta m \cdot \beta s < 70. \quad \text{Formula (21):}$$

Also, when a focal length in the main scanning direction of the first lens is assumed to be fm1 and a focal length in the main scanning direction of the second conversion optical system is assumed to be fm3, the following condition formula (22) is preferably satisfied:

$$3 < |fm3/fm1| < 13. \quad \text{Formula (22):}$$

In the case where an inexpensive collimator lens with a small diameter is used, a desired image magnification ratio in the main scanning direction is difficult to obtain unless the above-described condition formula is satisfied. When a value of |fm3/fm1| is too large, the optical utilization efficiency is degraded, and hence necessary light intensity cannot be obtained on the scan surface. On the other hand, when the value of |fm3/fm1| is too small, the center-corner-ratio is largely reduced due to the variation in the inclination of the optical axes.

Furthermore, when the following condition formula (23) is satisfied, more appropriate optical utilization efficiency and center-corner-ratio can be realized:

$$7 < |fm3/fm1| < 9. \quad \text{Formula (23):}$$

Also, when a focal length in the main scanning direction of the first lens is assumed to be fm1 and a focal length in the main scanning direction of the second imaging optical system is assumed to be fm, the following condition formula (24) is preferably satisfied:

$$0.05 < |fm1/fm| < 0.3. \quad \text{Formula (24):}$$

When a value of |fm1/fm| is too large, the size of the first imaging optical system, namely, the whole optical scanner, becomes large, and hence, there arises a problem of jitter derived from the vibration. On the other hand, when the value of |fm1/fm| is too small, the curvature becomes large, and hence, high resolution cannot be realized because of occurrence of aberration.

Furthermore, when the following condition formula (25) is satisfied, more appropriate size and aberration can be realized:

$$0.06 < |fm1/fm| < 0.2. \quad \text{Formula (25):}$$

Moreover, when the following condition formula (26) is satisfied, more appropriate size and aberration can be realized:

$$0.07 < |fm1/fm| < 0.1. \quad \text{Formula (26):}$$

When the optical scanner according to that disclosed herein is used in an image forming apparatus, an image forming apparatus capable of a rapid writing operation can be realized at a low cost.

As will be presented by the detailed description of novel concepts, the first imaging optical system is composed of the first conversion optical system that converts the light beam emitted from the light source unit into a divergent light beam along the main scanning direction and into a convergent light beam along the sub scanning direction; and the second conversion optical system having a positive refracting power in the main scanning direction. Furthermore, the arrangement or the image magnification ratio of the respective optical systems is set within ranges defined by the above-described condition formulas. Accordingly, in an optical scanner of the over-field type in which the occurrence of jitter is suppressed, and in particular, in an optical scanner including the second imaging optical system composed of one curved mirror alone, high performances of the optical utilization efficiency and the center-corner-ratio can be attained.

DETAILED DESCRIPTION

Preferred embodiments will now be described.

Embodiment 1

Figure 1:
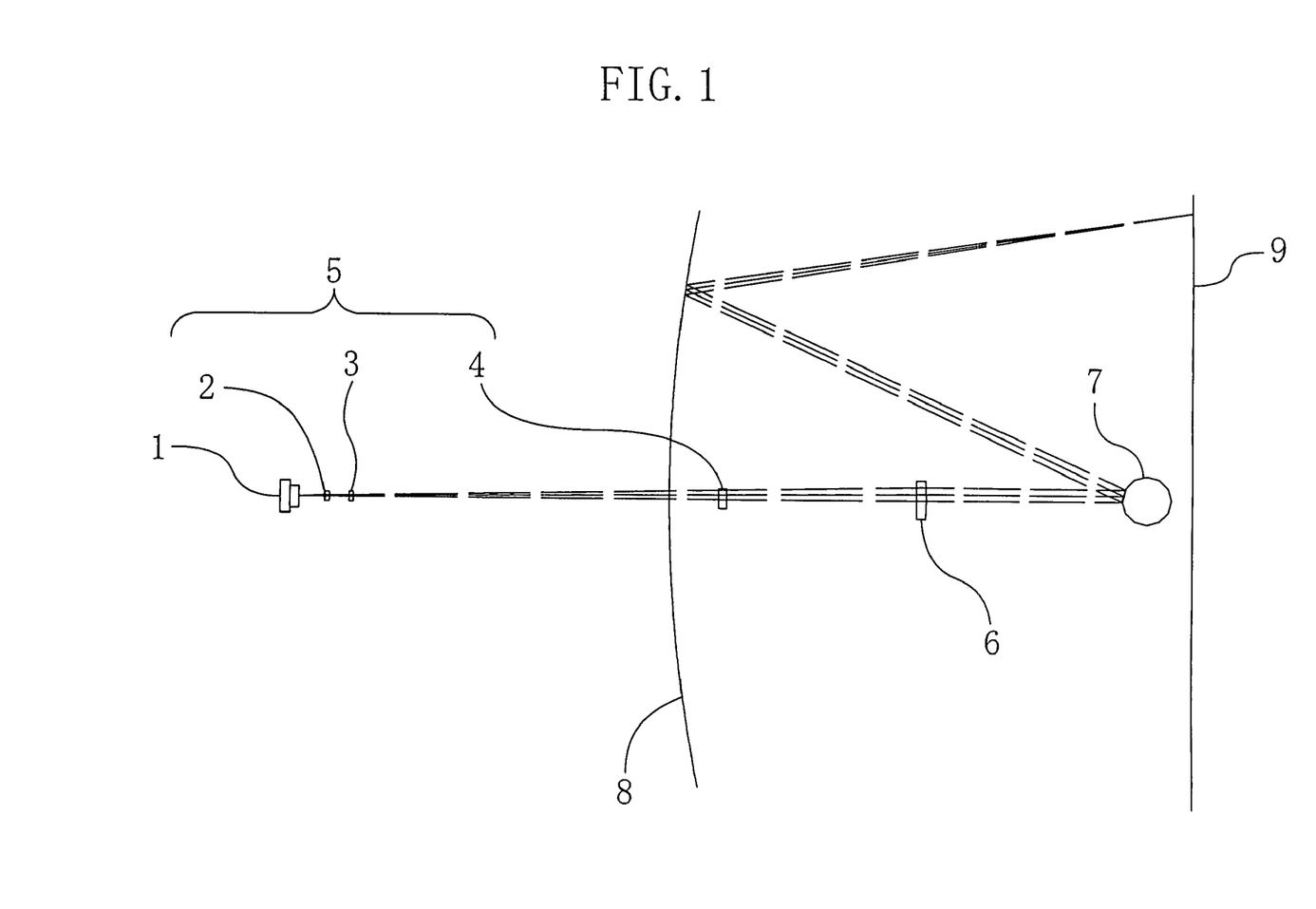
FIG. 1 is a diagram for showing the architecture of a principal portion of an optical scanner according to Embodiment 1.

FIG. 1 is a diagram for showing the architecture of an optical scanner according to Embodiment 1. In FIG. 1, a reference numeral 1 denotes a semiconductor laser having two light emitting points, a reference numeral 2 denotes a collimator lens, a reference numeral 3 denotes a first lens having a negative refracting power in a main scanning direction, a reference numeral 4 denotes a second lens having a refracting power in a sub scanning direction alone, a reference numeral 5 denotes a first conversion optical system composed of the collimator lens 2, the first lens 3 and the second lens 4, a reference numeral 6 denotes a third lens (a second conversion optical system) having a positive refracting power in the main scanning direction, a reference numeral 7 denotes a polygon mirror having a small diameter and multiple surfaces, a reference numeral 8 denotes a curved mirror, and a reference numeral 9 denotes a scan surface. The collimator lens 2, the first lens 3, the second lens 4 and the third lens 6 together form a first imaging optical system.

Light beams emitted from the two light emitting points of the semiconductor laser 1 are converted into substantially parallel light beams by the collimator lens 2. The substantially parallel light beams obtained by the collimator lens 2 are converted into divergent light beams by the first lens 3 with respect to the main scanning direction and are converted into convergent light beams by the second lens 4 with respect to the sub scanning direction. The light beams having passed through the second lens 4 are enlarged in their beam diameters along the main scanning direction and then are converted, by the third lens 6, into convergent light beams converged with respect to the main scanning direction. The light beams obtained by the third lens 6 form a linear image extending along the main scanning direction on a deflecting/reflecting surface of the polygon mirror 7. At this point, the width of the light beams along the main scanning direction is larger than the width of the deflecting/reflecting surface along the main scanning direction. In other words, the light beams enter the deflecting/reflecting surface of the polygon mirror 7 in what is called an over-field state. The light beams obtained through the deflection/reflection on the polygon mirror 7 are subjected to an imaging function of the curved mirror 8, so as to be focused for scanning on the scan surface 9.

In this optical scanner, since the light beams enter the polygon mirror 7 in the over-field state as a premise, the polygon mirror 7 with a small inscribed radius and having a large number of reflecting surfaces can be used. Therefore, the scanning speed can be increased without increasing the rotation number of the polygon mirror 7. Furthermore, since the polygon mirror 7 with a small inscribed radius can be used, load of the rotational driving is small, and hence, rapid rotational start or a low load motor can be employed.

Figure 2:
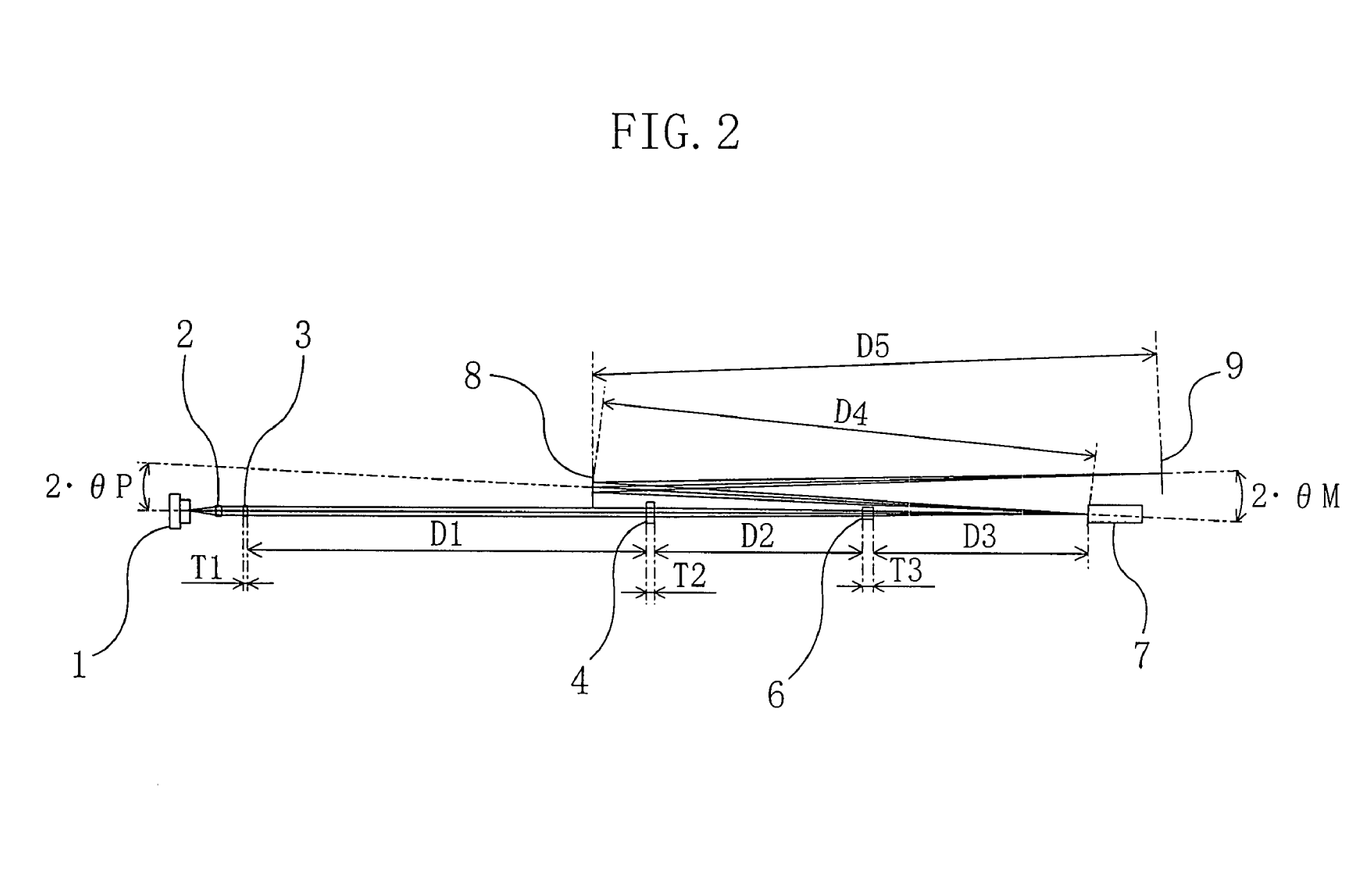
FIG. 2 is a cross-sectional view of the principal portion of the optical scanner of Embodiment 1 taken on a section along a sub scanning direction.

FIG. 2 is a cross-sectional view taken along the sub scanning direction of the optical scanner (namely, a cross-sectional view taken on a section perpendicular to the main scanning direction, which is hereinafter referred to as the sub scanning cross-sectional view). The light beams having passed through the first imaging optical system enter the polygon mirror 7 obliquely on the sub scanning cross-sectional plane. The light beams having been deflected/reflected by the polygon mirror 7 enter the curved mirror 8 obliquely. The light beams having entered the curved mirror 8 are converged by the optical power of the curved mirror 8, so as to be focused for scanning on the scan surface 9. In FIG. 2, T1, T2 and T3 respectively indicate the center thicknesses of the first lens 3, the second lens 4 and the third lens 6, and D1, D2 and D3 respectively indicate distances between the first lens 3 and the second lens 4, between the second lens 4 and the third lens 6 and between the third lens 6 and the polygon mirror 7. Also, D4 indicates a distance between the deflecting/reflecting surface and the curved mirror 8, and D5 indicates a distance between the curved mirror 8 and the scan surface 9. Furthermore, θP indicates an angle between the optical axis of the light beam from the first imaging optical system and the normal line of the deflecting/reflecting surface of the polygon mirror 7 (whereas an angle between the optical axis of incident light and the optical axis of reflected light is 2·θp), and θM indicates an angle between the optical axis of the light beam from the deflecting/reflecting surface and the normal line on the vertex of the curved mirror 8 (whereas an angle between the optical axis of incident light and the optical axis of reflected light is 2·θM). As is obvious from FIG. 2, with respect to the sub scanning cross-section, when the direction of the angle of the reflected light beam having been reflected by the deflecting/reflecting surface of the polygon mirror 7 against the incident light beam from the first imaging optical system is assumed to be a positive direction, the direction of the angle of the light beam reflected by the curved mirror 8 against the incident light beam from the deflecting/reflecting surface is a negative direction.

The shape of the surface of the curved mirror 8 used in each numerical example described below is represented by the following formula (27), wherein x and y respectively indicate a sub scanning direction coordinate and a main scanning direction coordinate with the vertex of the surface set as the origin and z indicates sag from the vertex (whereas the proceeding direction of the incident light beam is assumed to be positive):

$$Z = f(y) + \frac{\frac{x^2}{g(y)} - 2x \cdot \sin\{\theta(y)\}}{\cos\{\theta(y)\} + \sqrt{\cos^2\{\theta(y)\} - \left(\frac{x}{g(y)}\right)^2 + \frac{2x \cdot \sin\{\theta(y)\}}{g(y)}}} \quad \text{Formula (27)}$$

whereas $$f(y) = \frac{\left(\frac{y^2}{RDy}\right)}{1 + \sqrt{1 - (1+k)\left(\frac{y}{RDy}\right)^2}} + ADy^4 + AEy^6 + AFy^8 + AGy^{10}$$

$$g(y) = RDx(1 + BCy^2 + BDy^4 + BEy^6 + BFy^8 + BGy^{10})$$

$$\theta(y) = ECy^2 + EDy^4 + EEy^6$$

At this point, f(y) is a formula indicating a non-arc corresponding to the shape on a bus line; g(y) is a formula indicating a curvature radius along the sub scanning direction (i.e., the x direction) obtained in a position y; and θ(y) is a formula indicating torsion obtained in the position y. Furthermore, RDy (mm) indicates a curvature radius on the vertex along the main scanning direction; RDx (mm) indicates a curvature radius along the sub scanning direction; K is a circular conic constant indicating the shape of the bus line; AD, AE, AF and AG are high-order constants indicating the shape of the bus line; BC, BD, BE, BF and BG are constants for determining the curvature radius along the sub scanning direction obtained in the position y; EC, ED and EE are torsion constants for determining the torsion obtained in the position y. In this manner, the shape of the curved mirror 8 is defined so as to correct curvature of a main field, curvature of a sub field and an fθ error. In other words, the curvature radius along the sub scanning direction corresponding to the non-arc shape of the main scanning cross-section and each image height is determined so as to correct the curvature of the main field, the curvature of the sub field and the fθ error, and the torsion of a plane in a position corresponding to each image height is determined for correcting the curvature of the scanning line.

In this embodiment, the light beam enters the deflecting/reflecting surface of the polygon mirror 7 obliquely against the sub scanning direction (at the incident angle θP). Therefore, in the case where the distances between the respective deflecting/reflecting surfaces of the polygon mirror 7 and the rotation center axis are varied (which corresponds to what is called optical face deflection Δrp), scanning positions along the sub scanning direction are varied (which corresponds to what is called jitter ΔXi1). Assuming that the image magnification ratio along the sub scanning direction of the curved mirror 8 is βs2, the jitter ΔXi1 derived from the optical face deflection is represented by the following formula (28):

$$\Delta Xi1 = 2 \cdot \Delta rp \cdot \sin \theta P \cdot \beta s2 \quad \text{Formula (28):}$$

In the case where the conjugate relationship between the deflecting/reflecting surface and the scan surface 9 is shifted (by ΔZd), variation (corresponding to jitter ΔXi2) of the scanning position along the sub scanning direction is caused on the scan surface 9 depending upon the inclination (corresponding to what is called a face dangle angle Φp) of each face of the polygon mirror 7 along the sub scanning direction. The jitter ΔXi2 derived from the face dangle is represented by the following formula (29):

$$\Delta Xi2 = \Delta Zd \cdot \tan(2 \cdot \Phi p / \beta s2) \qquad \text{Formula (29):}$$

Figure 3:
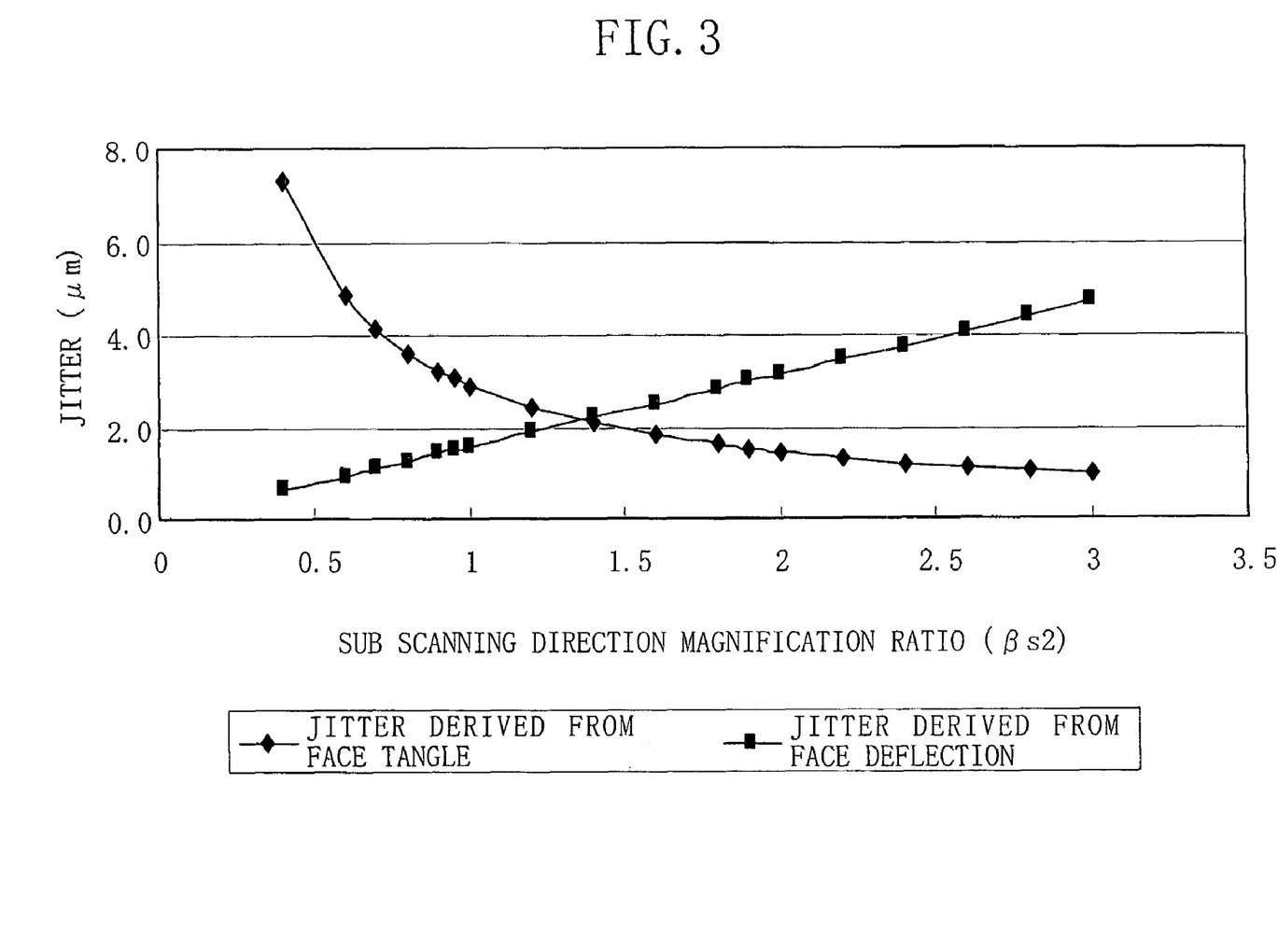
FIG. 3 is a graph for showing the relationship between jitter derived from a face tangle error or a face deflection error of a polygon mirror and a magnification ratio βs2 in the sub scanning direction of a second imaging optical system.

The relationship between the magnification ratio βs2 and the jitter obtained in assuming that the deflection Δrp is 0.03 mm, the angle θP is 1.5 degrees, the shift ΔZd is 2 mm and the angle Φp is 150 seconds is shown in FIG. 3.

At this point, when the following condition formula (30) is satisfied, the jitter can be suppressed to 4 μm or less:

$$0.7 < \beta s2 < 2.6 \qquad \text{Formula (30):}$$

Furthermore, when the following condition formula (31) is satisfied, the jitter can be suppressed to 3 μm or less:

$$0.95 < \beta s2 < 2.0 \qquad \text{Formula (31):}$$

Specific examples of numerical values for the second imaging optical system are listed in the following table: It is herein assumed that the design wavelength is 780 nm, that the number of polygon mirror surfaces is Np, that the polygon inscribed radius is rp, that the maximum image height is Ymax and the polygon rotation angle corresponding to the maximum image height is αmax. Also, the image magnification ratio βs2 along the sub scanning direction is 1.15.

| Ymax | 150 | αmax | 12.727 | | | | | | |
|---|---|---|---|---|---|---|---|---|---|
| Np | 12 | rp | 12.5 | | | | | | |
| θP | 1.5 | θM | 2.36 | | | | | | |
| D4 | 231.4 | D5 | 265.7 | | | | | | |
| RDy | −764.611 | RDx | −247.6 | | | | | | |
| K | 0.00000E+00 | AD | 2.32228E−10 | AE | 1.72699E−15 | AF | 0.00000E+00 | AG | 0.00000E+00 |
| BC | −2.26813E−06 | BD | −5.66856E−13 | BE | −2.13544E−16 | BF | 8.83488E−21 | BG | 0.00000E+00 |
| EC | 1.51835E−07 | ED | 1.36877E−13 | EE | 6.41461E−19 | | | | |

Specific examples of numerical values for the first imaging optical system corresponding the aforementioned second imaging optical system are listed in the following tables: It is herein assumed that the focal length of the collimator lens 2 is Fc, that the first lens 3 is a cylindrical lens concave in the main scanning direction with a focal length of fm1, that the second lens 4 is a cylindrical lens convex in the sub scanning direction with a focal length of fs2, that the third lens 6 is a cylindrical lens convex in the main scanning direction in Numerical Examples 1 and 2 and is a spherical convex lens in Numerical Example 3 each with a focal length of fm3.

NUMERICAL EXAMPLE 1

| | | Focal length | | Thickness | | Distance | |
|---|---|---|---|---|---|---|---|
| Collimator | Axial symmetrical lens | fc | 14.5 | | | | |
| First lens | Main concave cylindrical lens | fm1 | −30 | T1 | 2.1 | D1 | 34.2 |
| Second lens | Sub convex cylindrical lens | fs2 | 350 | T2 | 4 | D2 | 249.4 |
| Third lens | Main convex cylindrical lens | fm3 | 250 | T3 | 5 | D3 | 100 |

NUMERICAL EXAMPLE 2

| | | Focal length | | Thickness | | Distance | |
|---|---|---|---|---|---|---|---|
| Collimator | Axial symmetrical lens | fc | 14.5 | | | | |
| First lens | Main concave cylindrical lens | fm1 | −30 | T1 | 2.1 | D1 | 186.6 |
| Second lens | Sub convex cylindrical lens | fs2 | 200 | T2 | 4 | D2 | 97.1 |
| Third lens | Main convex cylindrical lens | fm3 | 250 | T3 | 5 | D3 | 100 |

NUMERICAL EXAMPLE 3

| | | Focal length | | Thickness | | Distance | |
|---|---|---|---|---|---|---|---|
| Collimator | Axial symmetrical lens | fc | 14.5 | | | | |
| First lens | Main concave cylindrical lens | fm1 | −30 | T1 | 2.1 | D1 | 99.3 |

-continued

| | | Focal length | | Thickness | | Distance | |
|---|---|---|---|---|---|---|---|
| Second lens | Sub convex cylindrical lens | fs2 | 350 | T2 | 4 | D2 | 184.4 |
| Third lens | Spherical convex lens | fm3 | 250 | T3 | 5 | D3 | 100 |

Various values obtained in the respective numerical examples are summarized in the following table, in which all the values satisfy the corresponding condition formulas described above:

| | Numerical Example 1 | Numerical Example 2 | Numerical Example 3 |
|---|---|---|---|
| \|fm3/fm1\| | 8.33 | 8.33 | 8.33 |
| \|fm1/fm\| | 0.0785 | 0.0785 | 0.0785 |
| βm | 2.4 | 2.4 | 2.4 |
| βs | 27.8 | 15.9 | 17.1 |
| βs1 | 24.1 | 13.8 | 14.9 |
| βm · βs | 66.72 | 38.16 | 41.04 |
| Fm | 21.95 | 21.95 | 21.95 |
| Fs | 1.85 | 3.23 | 3.15 |
| $D3 \cdot \tan[2 \cdot \theta P - \sin^{-1}\{1/(Fs \cdot \beta s1)\}]$ | 2.99 | 2.99 | 3.11 |

Furthermore, assuming that an angle of the straight line linking the two light emitting points against a plane parallel to the main scanning direction is γ, that the distance between adjacent light emitting points is Po, that an image magnification ratio in the sub scanning direction of all the systems from a light source unit to the scan surface 9 is βs, and that a spot distance in the sub scanning direction on the scan surface 9 is Pis, the following condition formula (32) is satisfied:

$$\beta s \cdot Po \cdot \sin(\gamma) = Pis \qquad \text{Formula (32):}$$

Therefore, when the distance Po between the light emitting points in the semiconductor laser 1 is 14 μm, in order to attain a scanning line distance of 42.3 μm in the sub scanning direction on the scan surface 9, the angle γ is 6.24 degrees.

Figure 4:
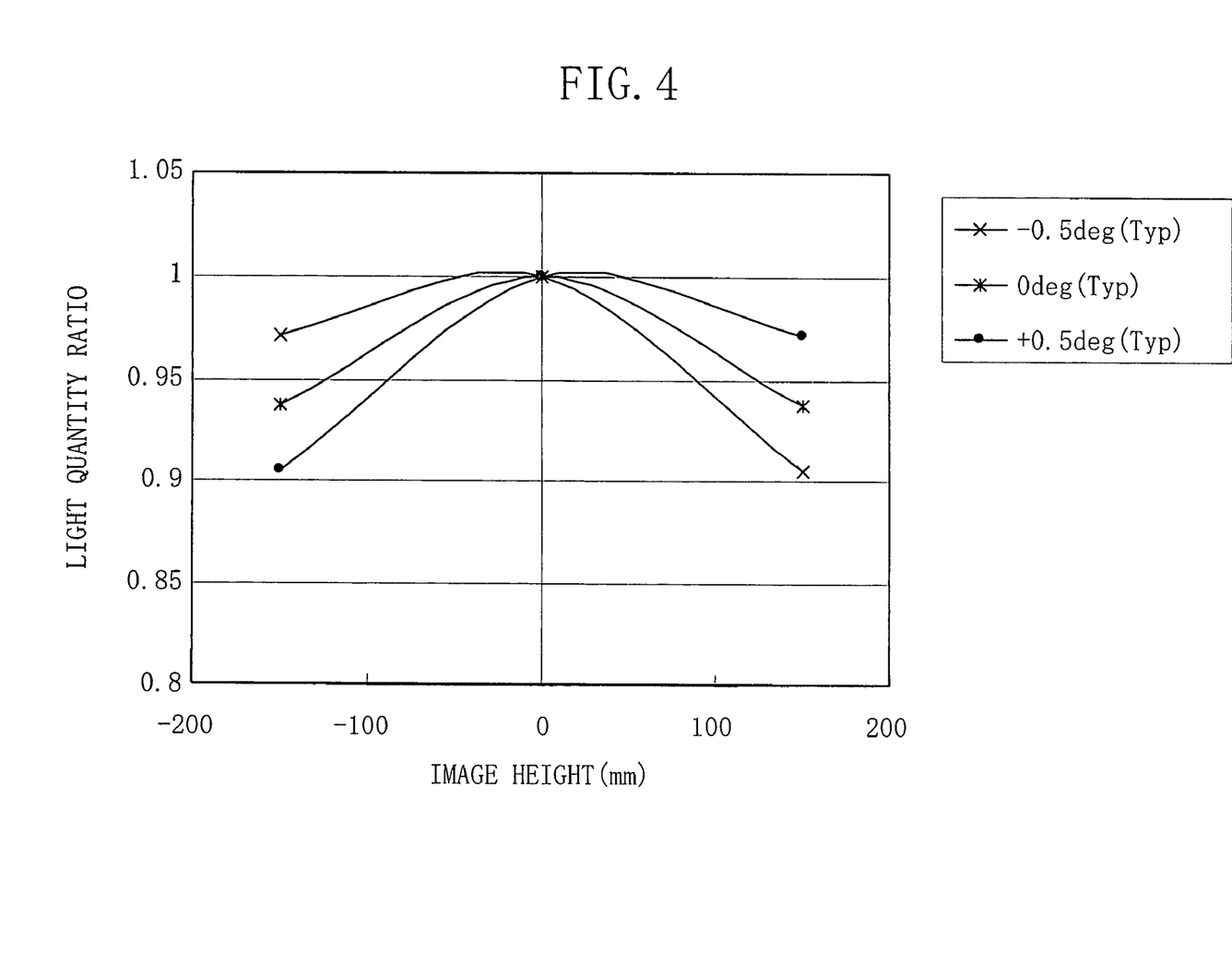
FIG. 4 is a graph for showing results of a simulation for a center-corner-ratio employing values of Numerical Example 1.

The center-corner-ratio obtained in Numerical Example 1 is shown in FIG. 4. FIG. 4 shows results of simulations performed by assuming that the variation in the two optical axes of the semiconductor laser 1 is ±0.5 degrees. In this case, a center-corner-ratio of 90% is attained even when the variation is taken into consideration. It is assumed in the simulations that a radiation angle (full angle at half maximum) of a direction horizontal to junction (i.e., a direction along which the two light emitting points are arranged) is 9 degrees and that a radiation angle along a vertical direction is 31 degrees.

Figure 5:
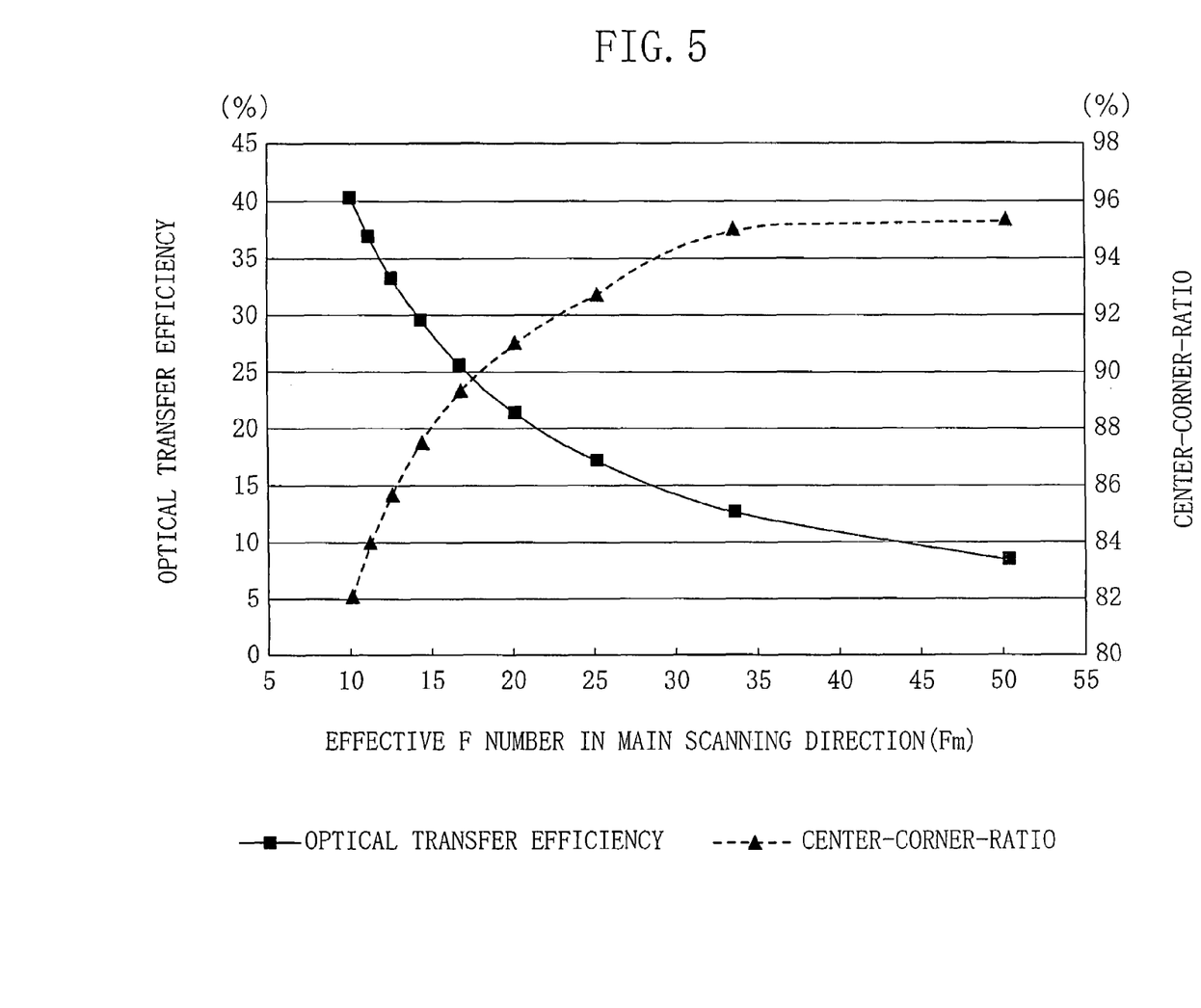
FIG. 5 is a graph for showing results of a simulation for optical transfer efficiency and the center-corner-ratio obtained when an effective F number Fm in a main scanning direction is changed.

Furthermore, FIG. 5 shows results of simulations for the optical transfer efficiency and the center-corner-ratio obtained by changing the design values of the first imaging optical system so as to change an effective F number Fm in the main scanning direction on the side of the light source unit. It is assumed in the simulations that the semiconductor laser 1 has the aforementioned radiation angles and that the image magnification ratio βs in the sub scanning direction is all 27.8.

In this case, when the following condition formula (33) is satisfied, optical transfer efficiency of 8% or more and a center-corner-ratio of 82% or more can be attained:

$$10 < Fm < 50 \qquad \text{Formula (33):}$$

Furthermore, when the following condition formula (34) is satisfied, optical transfer efficiency of 14% or more and a center-corner-ratio of 88% or more can be attained:

$$15 < Fm < 34 \qquad \text{Formula (34):}$$

Moreover, when the following condition formula (35) is satisfied, optical transfer efficiency of 19% or more and a center-corner-ratio of 90% or more can be attained:

$$18 < Fm < 23 \qquad \text{Formula (35):}$$

Also, assuming that the effective F number in the main scanning direction on the side of the scan surface is Fmi and that the magnification ratio in the main scanning direction of all the systems is βm, the magnification ratio βm is represented by the following formula (36): Therefore, in the case where the F number Fmi is 50 so as to attain a beam diameter (1/e^2) of approximately 70 μm at a wavelength of 780 nm, the magnification ratios βm corresponding to the effective F number Fm satisfying the formulas (33), (34) and (35) are represented by the following formulas (37), (38) and (39), respectively:

$$\beta m = Fmi/Fm \qquad \text{Formula (36):}$$

When the following formula (37) is satisfied, optical transfer efficiency of 8% or more and a center-corner-ratio of 82% or more can be attained:

$$1.0 < \beta m < 5 \qquad \text{Formula (37):}$$

When the following condition formula (38) is satisfied, optical transfer efficiency of 14% or more and a center-corner-ratio of 88% or more can be attained:

$$1.5 < \beta m < 3.4 \qquad \text{Formula (38):}$$

When the following condition formula (39) is satisfied, optical transfer efficiency of 19% or more and a center-corner-ratio of 90% or more can be attained:

$$2.2 < \beta m < 2.8 \qquad \text{Formula (39):}$$

Figure 6:
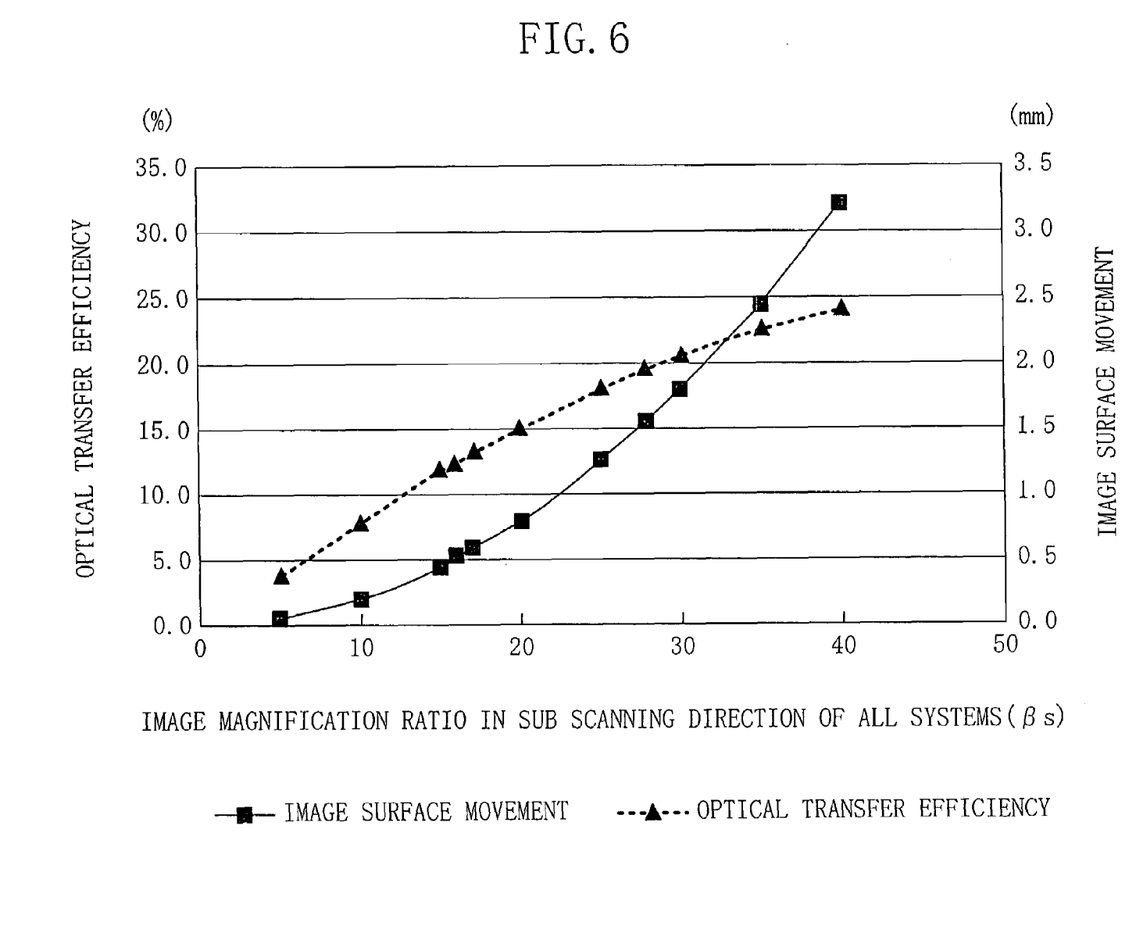
FIG. 6 is a graph for showing results of a simulation for the optical transfer efficiency and image surface movement obtained when a magnification ratio βs in the sub scanning direction of all systems is changed.

Furthermore, FIG. 6 shows change of the optical transfer efficiency and movement of a paraxial sub scanning direction image surface (Gauss image face) caused in occurrence of a collimator lens position error (of 2 μm) in accordance with the change of the sub scanning direction image magnification ratio βs of all the systems. In this graph, it is assumed that the semiconductor laser 1 has the aforementioned radiation angles, that the effective F number Fm in the main scanning direction on the side of the light source unit is 21.95 and that the effective F number Fsi in the sub scanning direction on the side of the scan surface is 50.

In this case, when the following condition formula (40) is satisfied, optical transfer efficiency of 8% or more and image surface movement of 2.5 mm or less can be attained:

$$10 < \beta s < 36 \qquad \text{Formula (40):}$$

Furthermore, when the following condition formula (41) is satisfied, optical transfer efficiency of 14% or more and image surface movement of 2.0 mm or less can be attained:

$$19 < \beta s < 33 \qquad \text{Formula (41):}$$

Moreover, when the following condition formula (42) is satisfied, optical transfer efficiency of 19% or more and image surface movement of 1.5 mm or less can be attained:

$$27 < \beta s < 30 \qquad \text{Formula (42):}$$

Also, an F number Fs is represented by the following formula (43) in which the effective F number in the sub scanning direction on the side of the scan surface is indicated by Fsi and the sub scanning direction magnification ratio of all the systems is indicated by βs: Furthermore, in the case where the effective F number Fsi is 5.0 for attaining a beam diameter (1/e^2) of approximately 70 μm at a wavelength of 780 nm, the F number Fs satisfying the condition formulas (40), (41) and (42) are represented by the following condition formulas (44), (45) and (46), respectively:

$$Fs = Fsi/\beta s \qquad \text{Formula (43):}$$

When the following condition formula (44) is satisfied, optical transfer efficiency of 8% or more and image surface movement of 2.5 mm or less can be attained:

$$1.3 < Fs < 5 \qquad \text{Formula (44):}$$

When the following condition formula (45) is satisfied, optical transfer efficiency of 14% or more and image surface movement of 2.0 mm or less can be attained:

$$1.5 < Fs < 2.5 \qquad \text{Formula (45):}$$

When the following condition formula (46) is satisfied, optical transfer efficiency of 19% or more and image surface movement of 1.5 mm or less can be attained:

$$1.7 < Fs < 1.9 \qquad \text{Formula (46):}$$

Embodiment 2

Figure 7:
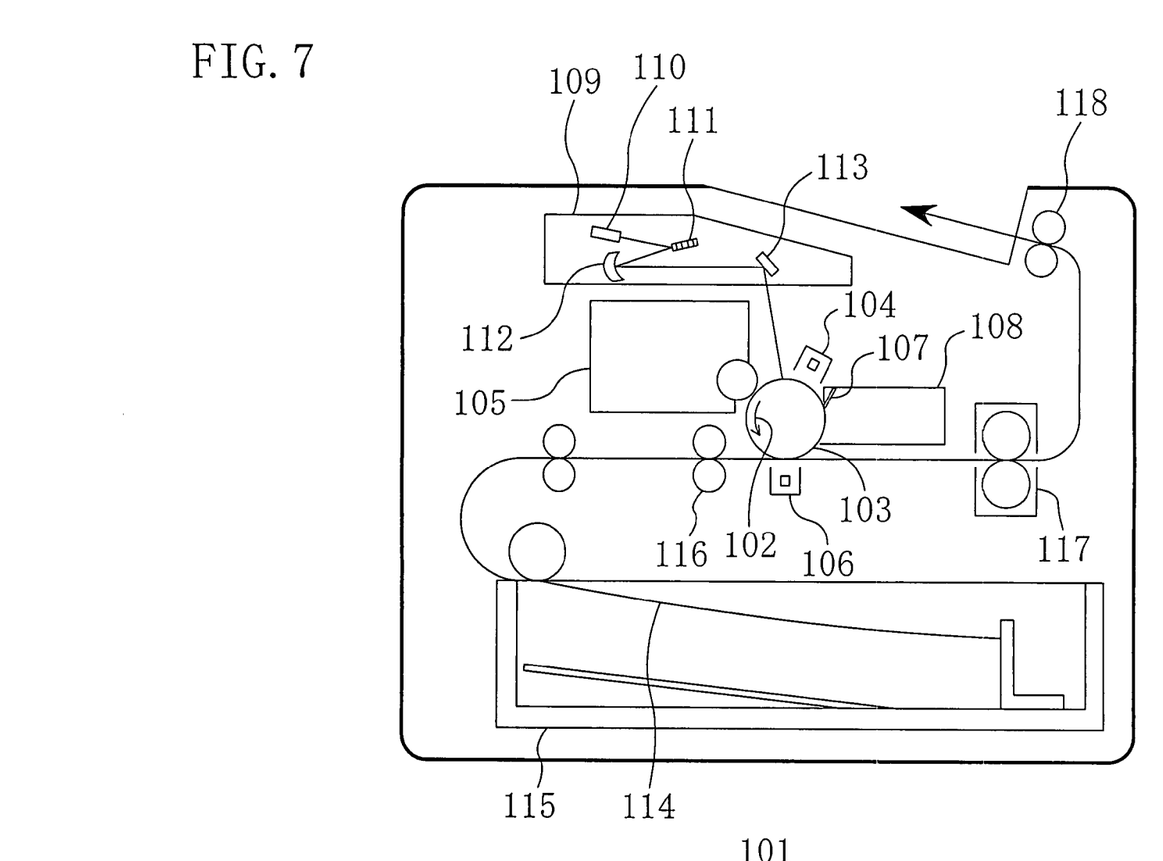
FIG. 7 is a diagram for showing the internal architecture of an image forming apparatus utilizing the novel imaging concepts disclosed herein.

FIG. 7 shows an image forming apparatus equipped with the optical scanner according to Embodiment 1. In the substantially center portion within a body 101, a photoconductor drum 103 rotationally driven along a direction shown with an arrow 102 is disposed. Around the photoconductor drum 103, a charging device 104, a developing device 105, a transferring device 106 and a cleaner 108 having a blade 107 for scrubbing off toner remaining on the photoconductor drum 103 are provided. Light beams emitted from an optical scanner 109 enter, for scanning, the surface of the photoconductor drum 103 charged to a desired potential by the charging device 104. Thus, a desired image is formed as a latent image on the surface of the photoconductor drum 103. This latent image is developed by the developing device 105 into a toner image.

The optical scanner 109 includes a first imaging optical system 110 for allowing light beams from a light source unit (not shown) to enter one deflecting/reflecting surface of a rotating polygon mirror 111 and forming, on the deflecting/reflecting surface, a linear image with a width larger than the width of the deflecting/reflecting surface along a main scanning direction. The light beams having passed through the first imaging optical system 110 are deflected by the rotating polygon mirror 111, and the deflected light beams are reflected by a curved mirror 112. The light beams having been reflected by the curved mirror 112 are focused for scanning on the photoconductor drum 103. Since the light beams from the curved mirror 112 are bent to a desired direction by a reflection mirror 113, preferable or optimum arrangement of the optical scanner 109 within the body 101 can be attained. At the same time as the proceeding of this development process, recording paper 114 is fed one by one from a paper feeding cassette 115 provided in a lower portion of the body 101 and carried to a transferring portion through timing rollers 116. In the transferring portion, the toner image is transferred onto the recording paper 114 and the transferred image is fixed by a fixing device 117. After fixing the image, the recording paper 114 is discharged onto the top face of the body 101 through discharging rollers 118.

In this manner, when the optical scanner of Embodiment 1 is used, a rapid, compact and inexpensive image forming apparatus with high resolution can be realized.

Although the novel concepts have been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An optical scanner comprising:
    a light source for emitting a light beam;
    a rotating polygon mirror having a plurality of mirror surfaces for scanning said light beam emitted from said light source along a main scanning direction;
    a first imaging optical system disposed between said light source and said rotating polygon mirror for forming, on a mirror surface of said rotating polygon mirror, a linear image; and
    a second imaging optical system composed of a curved mirror for focusing, on a scan surface, said light beam having been reflected by said rotating polygon mirror, wherein said first imaging optical system comprises:
    a first conversion optical system for converting said light beam emitted from said light source into a divergent light beam with respect to the main scanning direction and into a convergent light beam with respect to a sub scanning direction; and
    a second conversion optical system having a refracting power in the main scanning direction.

2. The optical scanner of claim 1, wherein, said first imaging optical system and said second imaging optical system are disposed in different positions along a sub scanning direction perpendicular to the main scanning direction.

3. The optical scanner of claim 1, wherein said first imaging optical system and said second imaging optical system are configured such that said light beam exited from said first imaging optical system obliquely enters a plane that includes a normal line of said mirror surface of said rotating polygon mirror and is parallel to the main scanning direction and said light beam exited from said rotating polygon mirror obliquely enters a YZ plane that includes a normal line on a vertex of said curved mirror and is parallel to the main scanning direction.

4. The optical scanner of claim 1, wherein the linear image has a width larger than a width along the main scanning direction of said mirror surface of said rotating polygon mirror.

5. The optical scanner of claim 1,
    wherein an image magnification ratio $\beta s2$ in the sub scanning direction of said second imaging optical system satisfies the following condition:

$0.7 < \beta s2 < 2.6$.

6. The optical scanner of claim 1,
    wherein an image magnification ratio $\beta s2$ in the sub scanning direction of said second imaging optical system satisfies the following condition:

$0.95 < \beta s2 < 2.0$.

7. The optical scanner of claim 1,
    wherein said curved mirror has a cross-section along the sub scanning direction in the shape of an arc.

8. The optical scanner of claim 1,
    wherein said curved mirror is in a shape for correcting curvature of a scanning line derived from oblique incident.

9. The optical scanner of claim 3,
    wherein said curved mirror is asymmetrical about said YZ plane.

10. The optical scanner of claim 3,
    wherein a reflecting surface of said curved mirror is in such a torsional shape that normal lines of points thereon other than the vertex disposed on a curve, designated as a bus line, on which said YZ plane and said reflecting surface cross each other are not included in said YZ plane.

11. The optical scanner of claim 10,
    wherein angles of normal lines of points on said bus line against said YZ plane are larger as said points are closer to a periphery of said reflecting surface.

12. The optical scanner of claim 10,
    wherein, assuming that an angle of said light beam reflected by said curved mirror against an incident light beam exited from said mirror surface is in a positive direction, angles of normal lines of points on said bus line against said YZ plane are in the positive direction.

13. The optical scanner of claim 1,
wherein said curved mirror is an anamorphic mirror in which a curvature radius on the vertex in the main scanning direction is different from a curvature radius in the sub scanning direction.

14. The optical scanner of claim 1,
wherein a reflecting surface of said curved mirror is in a concave shape in both the main scanning direction and the sub scanning direction.

15. The optical scanner of claim 1,
wherein said curved mirror has a refracting power in the sub scanning direction on a reflecting surface thereof different between a center portion thereof and a peripheral portion thereof along the main scanning direction.

16. The optical scanner of claim 1,
wherein said curved mirror has a curvature radius of a cross-section thereof in the sub scanning direction that does not depend upon a cross-sectional shape thereof in the main scanning direction.

17. The optical scanner of claim 1,
wherein, assuming a distance between a light exiting surface of said second conversion optical system and said mirror surface is assumed to be D3, an angle between the normal line of said mirror surface and an optical axis of said light beam exited from said first imaging optical system is assumed to be θP, an image magnification ratio in the sub scanning direction of said first imaging optical system is assumed to be βs1 and an effective F number in the sub scanning direction on the side of said light source is assumed to be Fs, the following condition is satisfied:

$1 < D3 \cdot \tan[2 \cdot \theta P - \sin^{-1}\{1/(Fs \cdot \beta s1)\}] < 10.$ 18. The optical scanner of claim 17,
wherein the following condition is satisfied:

$2 < D3 \cdot \tan[2 \cdot \theta P - \sin^{-1}\{1/(Fs \cdot \beta s1)\}] < 6.$

19. The optical scanner of claim 1,
wherein said first conversion optical system comprises:
a collimator lens,
a first lens having a negative refracting power in the main scanning direction, and
a second lens having a positive refracting power in the sub scanning direction arranged in this order from the side of said light source.

20. The optical scanner of claim 1,
wherein said second conversion optical system comprises a third lens having a positive refracting power in the main scanning direction.

21. The optical scanner of claim 19,
wherein said first lens is a cylindrical lens having a negative refracting power in the main scanning direction.

22. The optical scanner of claim 19,
wherein said first lens is a spherical lens having a negative refracting power.

23. The optical scanner of claim 19,
wherein said second lens is a cylindrical lens having a positive refracting power in the sub scanning direction.

24. The optical scanner of claim 20,
wherein said third lens is a cylindrical lens having a positive refracting power in the main scanning direction.

25. The optical scanner of claim 20,
wherein said third lens is a spherical lens having a positive refracting power.

26. The optical scanner of claim 1,
wherein said light source includes a plurality of light emitting points.

27. The optical scanner of claim 26,
wherein, when an angle of a straight line linking said plurality of light emitting points of said light source against a plane parallel to the main scanning direction is assumed to be γ, a distance between adjacent light emitting points is assumed to be Po, an image magnification ratio in the sub scanning direction of all systems disposed between said light source and the scan surface is assumed to be βs, and a spot distance in the sub scanning direction on said scan surface is assumed to be Pis, the following condition is satisfied:

$\beta s \cdot Po \cdot \sin(\gamma) = Pis.$

28. The optical scanner of claim 26,
wherein, when an image magnification ratio in the main scanning direction of all systems disposed between said light source and said scan surface is assumed to be βm, the following condition is satisfied:

$1.0 < \beta m < 5.$

29. The optical scanner of claim 28,
wherein said image magnification ratio βm satisfies the following condition:

$1.5 < \beta m < 3.4.$

30. The optical scanner of claim 29,
wherein said image magnification ratio βm satisfies the following condition:

$2.2 < \beta m < 2.8.$

31. The optical scanner of claim 26,
wherein, when an image magnification ratio in the sub scanning direction of all systems disposed between said light source and said scan surface is assumed to be βs, the following condition is satisfied:

$10 < \beta s < 36.$

32. The optical scanner of claim 31,
wherein said image magnification ratio βs satisfies the following condition:

$19 < \beta s < 33.$

33. The optical scanner of claim 32,
wherein said image magnification ratio βs satisfies the following condition:

$27 < \beta s < 30.$

34. The optical scanner of claim 27,
wherein, when an effective F number in the main scanning direction on the side of said light source is assumed to be Fm, the following condition is satisfied:

$10 < Fm < 50.$

35. The optical scanner of claim 34,
where said F number Fm satisfies the following condition:

$15 < Fm < 34.$

36. The optical scanner of claim 35,
wherein said F number Fm satisfies the following condition:

$18 < Fm < 23.$

37. The optical scanner of claim 26,
wherein, when an effective F number in the sub scanning direction on the side of said light source is assumed to be Fs, the following condition is satisfied:

1.3<Fs<5.

38. The optical scanner of claim 37,
wherein said F number Fs satisfies the following condition:

1.5<Fs<2.5.

39. The optical scanner of claim 38,
wherein said F number Fs satisfies the following condition:

1.7<Fs<1.9.

40. The optical scanner of claim 26,
wherein, when an image magnification ratio in the main scanning direction of all systems disposed between said light source and said scan surface is assumed to be βm and an image magnification ratio in the sub scanning direction thereof is assumed to be βs, the following condition is satisfied:

30<βm·βs<90.

41. The optical scanner of claim 40,
wherein said image magnification ratio βm and said image magnification ratio βs satisfy the following condition:

40<βm·βs<70.

42. The optical scanner of claim 19,
wherein, when a focal length in the main scanning direction of said first lens is assumed to be fm1 and a focal length in the main scanning direction of said second conversion optical system is assumed to be fm3, the following condition is satisfied:

3<|fm3/fm1|<13.

43. The optical scanner of claim 42,
wherein said focal length fm1 and said focal length fm3 satisfy the following condition:

7<|fm3/fm1|<9.

44. The optical scanner of claim 19,
wherein, when a focal length in the main scanning direction of said first lens is assumed to be fm1 and a focal length in the main scanning direction of said second imaging optical system is assumed to be fm, the following condition is satisfied:

0.07<|fm1/fm|<0.1.

45. An image forming apparatus, comprising:
an optical scanner, comprising
a rotating polygon mirror having a plurality of mirror surfaces for scanning a light beam emitted from a light source along a main scanning direction,
a first imaging optical system disposed between said light source and said rotating polygon mirror for forming, on a mirror surface of said rotating polygon mirror, a linear image, and
a second imaging optical system composed of a curved mirror for focusing, on a scan surface, said light beam having been reflected by said rotating polygon mirror,
wherein said first imaging optical system comprises:
a first conversion optical system for converting said light beam emitted from said light source into a divergent light beam with respect to the main scanning direction and into a convergent light beam with respect to a sub scanning direction; and
a second conversion optical system having a refracting power in the main scanning direction;
a photoconductor drum on which said light beam is focused via said curved mirror for forming a desired image as a latent image; and
a transferring device positioned relative to the photoconductor drum for transferring the latent image to recording media.

46. The image forming apparatus of claim 45, wherein, said first imaging optical system and said second imaging optical system are disposed in different positions along a sub scanning direction perpendicular to the main scanning direction.

47. The image forming apparatus of claim 45, wherein said first imaging optical system and said second imaging optical system are configured such that said light beam exited from said first imaging optical system obliquely enters a plane that includes a normal line of said mirror surface of said rotating polygon mirror and is parallel to the main scanning direction and said light beam exited from said rotating polygon mirror obliquely enters a YZ plane that includes a normal line on a vertex of said curved mirror and is parallel to the main scanning direction.

48. The image forming apparatus of claim 45, wherein the linear image has a width larger than a width along the main scanning direction of said mirror surface of said rotating polygon mirror.

49. The image forming apparatus of claim 45,
wherein said first conversion optical system comprises:
a collimator lens,
a first lens having a negative refracting power in the main scanning direction, and
a second lens having a positive refracting power in the sub scanning direction arranged in this order from a side for receiving the light beam.

50. The image forming apparatus of claim 45,
wherein said second conversion optical system comprises a third lens having a positive refracting power in the main scanning direction.

51. The image forming apparatus of claim 49,
wherein said first lens is a cylindrical lens having a negative refracting power in the main scanning direction.

52. The image forming apparatus of claim 49,
wherein said first lens is a spherical lens having a negative refracting power.

53. The image forming apparatus of claim 49,
wherein said second lens is a cylindrical lens having a positive refracting power in the sub scanning direction.

54. The image forming apparatus of claim 50,
wherein said third lens is a cylindrical lens having a positive refracting power in the main scanning direction.

55. The image forming apparatus of claim 50,
wherein said third lens is a spherical lens having a positive refracting power.

* * * * *